United States Patent [19]

Reynolds

[11] Patent Number: 4,530,679
[45] Date of Patent: Jul. 23, 1985

[54] SPROCKET WITH RADIAL CLEARING MEANS

[75] Inventor: Michael J. Reynolds, Gladstone, Oreg.

[73] Assignee: Omark Industries, Inc., Portland, Oreg.

[21] Appl. No.: 507,722

[22] Filed: Jun. 27, 1983

Related U.S. Application Data

[63] Continuation-in-part of Ser. No. 279,955, Jul. 2, 1981, abandoned.

[51] Int. Cl.³ .................... F16H 51/00; F16H 7/06; B23D 57/02; B27B 17/08
[52] U.S. Cl. .................................... 474/92; 474/156; 30/381
[58] Field of Search ............... 474/92, 156; 305/11, 305/57; 198/494, 834; 30/381, 382, 384, 385

[56] References Cited

U.S. PATENT DOCUMENTS 301,743  7/1884  Michael et al. ................. 305/11
1,668,778 5/1928 Mennigen ...................... 305/11
3,045,502 7/1962 Carlton ......................... 30/381
3,498,346 3/1970 Gasner et al. .................. 30/381
3,683,980 8/1972 Gasner ......................... 30/381
4,072,062 2/1978 Morling et al. ................ 198/834

Primary Examiner—Stephen J. Novosad
Assistant Examiner—Bruce M. Kisliuk
Attorney, Agent, or Firm—John W. Stuart

[57] ABSTRACT

A drive sprocket for use with an elongate, endless saw chain, the sprocket being a substantially cylindrical member having pockets spaced circumferentially thereabout for receiving drive tangs on the saw chain with sprocket edge margins adjacent the tang-receiving pockets providing support for bottom surfaces of the side links of the saw chain. The pockets have enlarged clearing portions opening radially outwardly from the sprocket which are wider than remainder portions of the pockets. The clearing openings are configured and positioned to allow debris to clear radially from the pockets.

18 Claims, 10 Drawing Figures

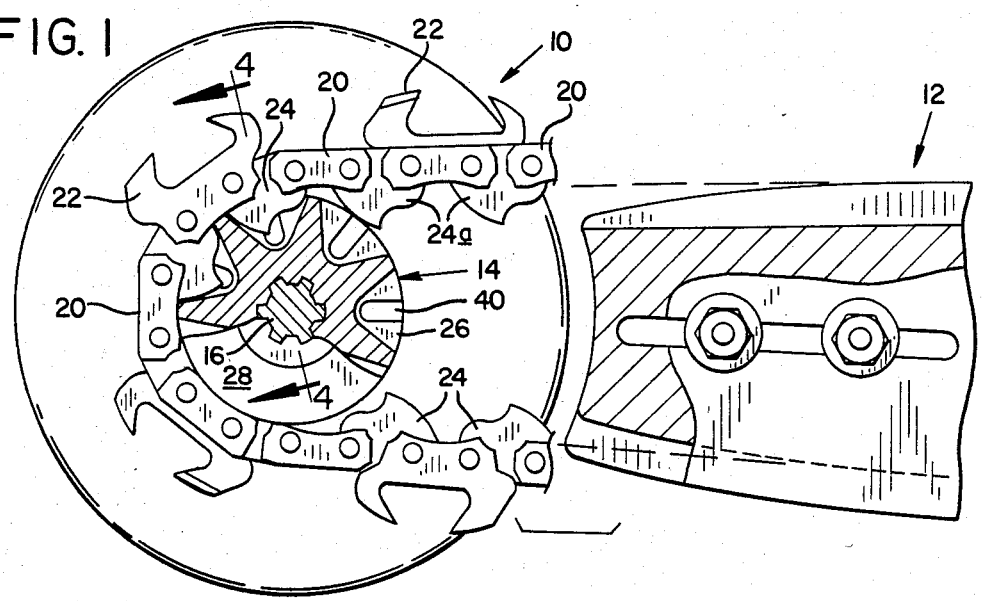
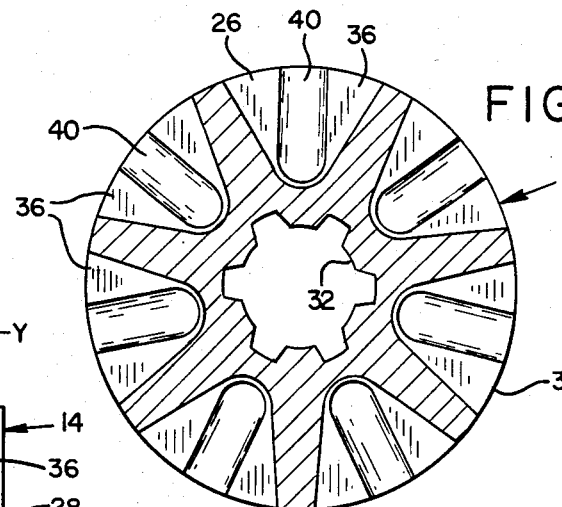
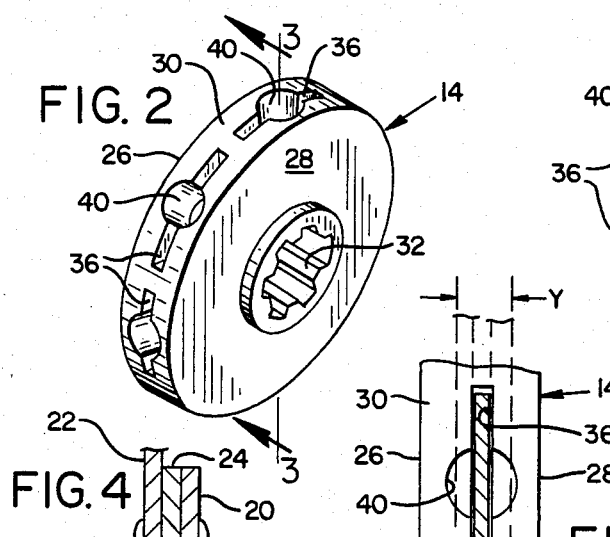
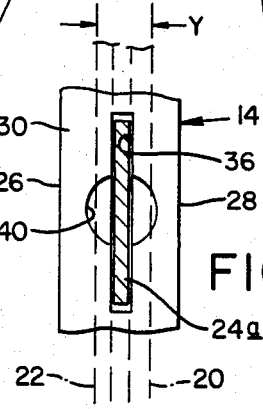
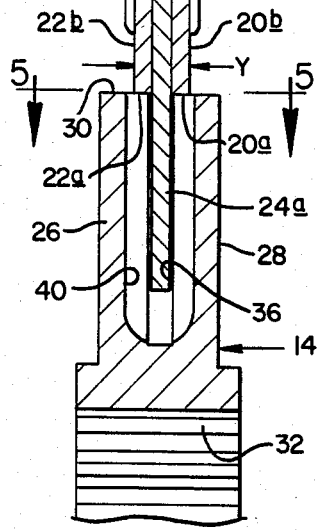
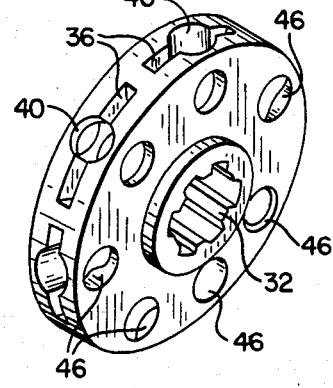
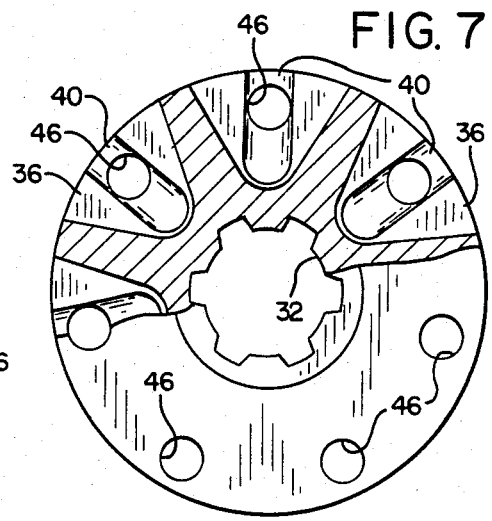

SPROCKET WITH RADIAL CLEARING MEANS

CROSS REFERENCE TO RELATED APPLICATION

This application is a continuation-in-part of my copending application Ser. No. 279,955, filed July 2, 1981 for Sprocket With Radial Clearing Means.

BACKGROUND AND SUMMARY OF THE INVENTION

This invention relates to a drive sprocket for a saw chain, wherein the sprocket has pockets for receiving the drive tangs on the saw chain and debris-clearing openings associated with the pockets which are wider than remainder portions of the pockets to allow debris to clear radially therefrom.

Chain saws generally comprise four major components; an endless saw chain, an elongate bar to support the chain around the edges of which the chain is trained for travel, power drive means in the form of a motor, and means including a sprocket to drivingly connect the shaft of the motor to the saw chain. The saw chain generally has opposed side links, interposed between which are drive links pivotally connected thereto with drive tangs extending below the bottom surfaces of the side links. Sprockets, generally referred to as rim sprockets, are known which have drive tang-receiving pockets of such depth and width that most of the bottom surfaces of the side links rest against and are supported by the peripheral edges of the rim portion of the sprocket. In the past such pockets have been of substantially constant width throughout the length of the pocket.

A problem accompanying chain saw use is the collection of chips and other debris or foreign matter in the pockets of such drive sprockets. Such matter is carried by the chain into the pockets, and eventually accumulates therein unless there is some clearing means. If the debris builds up in the pocket, it can be detrimental to the chain and other parts of the equipment. For instance, as debris piles up in a pocket, it prevents the chain from seating properly on the sprocket which increases the tension in the chain as it is driven around the sprocket and bar. It also may lift the drive links from the periphery of the sprocket producing instability as the chain travels about the sprocket.

In chain saws with automatic sharpening devices positioned adjacent the sprocket, buildup of debris, chips, and other foreign matter in the pockets of the sprocket can produce uneven sharpening. Explaining further, the sharpening apparatus adjacent the sprocket is positioned to engage the tops of cutter links in the chain as they are carried in an arc about the sprocket. The sharpening means is held in a selected position spaced radially outwardly from the sprocket to grind the tops of the cutter links. Should an individual pocket be impacted with excess chips or other foreign matter it can cause the cutter link adjacent the drive link in that pocket to be shifted radially outwardly a distance farther from the sprocket than other cutter links, resulting in uneven sharpening, and possibly damage to the chain or sharpening equipment.

A general object of the present invention is to provide a novel sprocket having means permitting effective radial clearing of chips and other foreign matter from the sprocket while still fully supporting the side links of the chain.

A more specific object of the present invention is to provide a drive sprocket for a chain saw in which clearance ports open radially to the periphery of the sprocket and are so positioned relative to a chain trained on the sprocket that they open into regions between leading and following side links in the chain to allow debris to exit radially from the sprocket.

Yet another object of the present invention is to provide such a novel sprocket in which drive tang-receiving pockets on the sprocket have widths through a major portion of their length which are only slightly greater than the width of a drive tang on the chain to provide stability for the chain as it is driven by the sprocket, and have clearance openings which are a minor portion of the length of the associated pocket but have greater width than remainder portions of the pocket.

A still further object of the invention is to provide such a novel sprocket in which a clearance opening diverges substantially continuously on progressing radially outwardly toward the periphery of the sprocket.

DRAWINGS

These and other objects and advantages will become more fully apparent as the following description is read in conjunction with the drawings wherein:

FIG. 1 illustrates a sprocket according to an embodiment of the invention mounted on a chain saw and illustrating a portion of a saw chain and bar which may be associated therewith;

FIG. 2 is an enlarged perspective view of the sprocket of FIG. 1 removed from the chain saw;

FIG. 3 is an enlarged cross-sectional view taken generally along the line 3—3 in FIG. 2;

FIG. 4 is an enlarged cross-sectional view taken generally along the line 4—4 in FIG. 1;

FIG. 5 is a view taken generally along the line 5—5 in FIG. 4;

FIG. 6 is a perspective view of a second embodiment of the invention;

FIG. 7 is an enlarged side view of the sprocket illustrated in FIG. 6 with portions broken away;

DESCRIPTION OF A PREFERRED EMBODIMENT OF THE INVENTION

Figure 8:
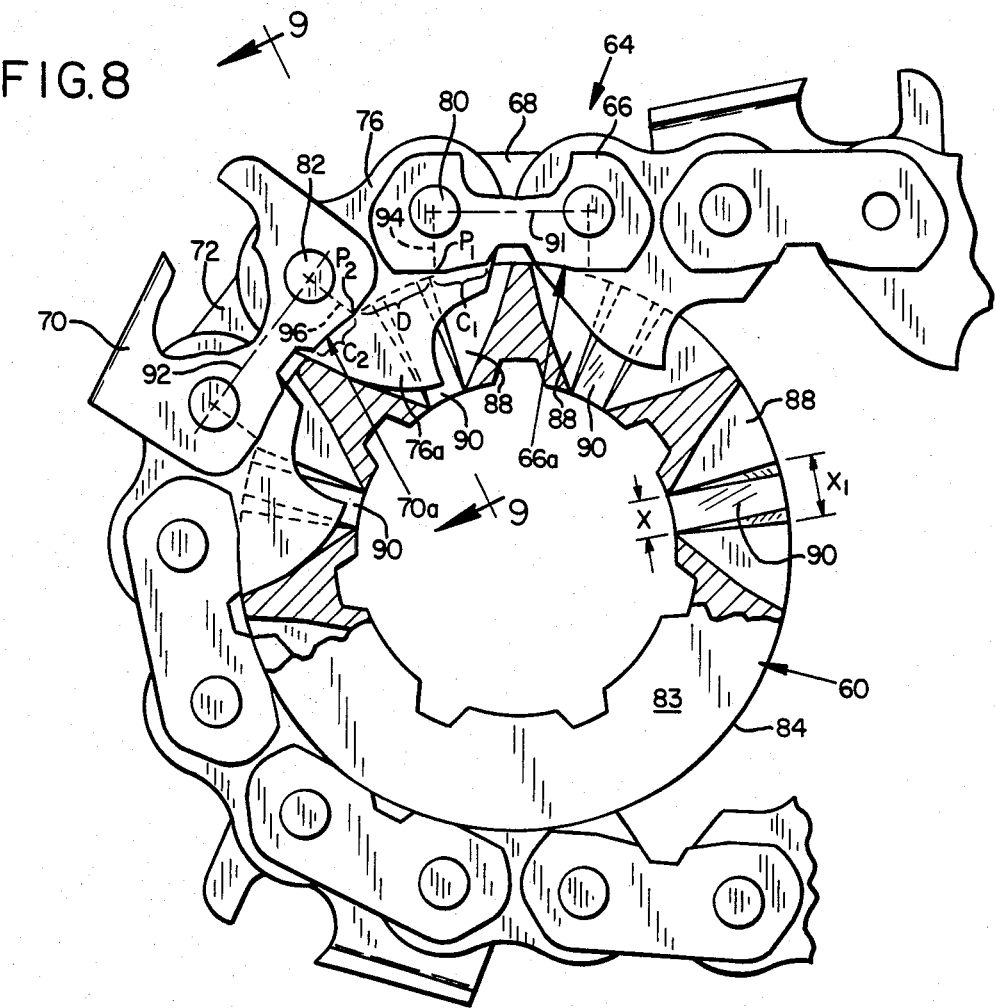
FIG. 8 is a side elevation view with portions broken away of a sprocket according to a third embodiment of the invention with a portion of a saw chain trained thereabout.

Referring to the drawings, and first more specifically to FIG. 1, at 10 is indicated generally a portion of a saw chain which is trained about an elongate bar 12 and is driven by a sprocket 14 constructed according to an embodiment of the invention. The sprocket has a splined connection with a drive shaft 16 which is connected to the motor of a chain saw (not shown).

As is known, the saw chain has a plurality of laterally spaced, opposed side links, some of which are merely tie-straps 20 and others of which are cutterlinks 22. Interposed between side links 20, 22 and pivotally connected thereto are drive links 24.

As is best seen in FIG. 4, the side links have bottom surfaces 20a, 22a adapted to rest on marginal edge portions of the sprocket as will be described in greater detail below. Further, the outwardly facing surfaces 20b, 22b of the side links have a side-to-side dimension "Y" as seen in FIG. 4, also referred to herein as a preselected first distance.

The drive link 24 has a drive tang 24a of a preselected length and thickness which extends below bottom surfaces 20a, 22a of the side links as is seen in FIGS. 1 and 4.

Drive sprocket 14 is a substantially cylindrical member having opposed side wall sections 26, 28 and a peripheral edge 30 extending therebetween. A splined bore 32 extends axially therethrough.

Spaced apart circumferentially about the sprocket are drive tang-receiving pockets 36. Each pocket has a length, as measured circumferentially of the sprocket, at least as great as the length of the drive tang 24a on the chain to be received therein, and has a depth at least as great as the distance that the drive tang on the chain projects below the bottom surfaces of the side links. A pocket throughout a major portion of its length has a width slightly greater than the width of drive tang 24a, but narrower than the outer side-to-side dimension "Y" of the side links in the chain. In this way a drive tang on the chain may be received within a pocket with bottom surfaces 20a, 22a of the side links resting on edge margins of the periphery 30 of the sprocket adjacent the pockets.

Minor portions of the pockets, referred to herein as clearing portions, or openings, are illustrated at 40. Each clearing portion may be a substantially cylindrical bore as shown extending radially inwardly from the periphery of the member to a position adjacent the bottom of its associated tang-receiving pocket 36. The bore has a mouth opening to the periphery of the member which is wider than the side-to-side dimension "Y" of the side links. The bore, however, is only a minor portion of the length of the tang-receiving pocket as measured circumferentially of the sprocket whereby the drive tang is held in a relatively stable position as it is carried about the sprocket.

In operation, as the sprocket is rotatably driven, successive drive tangs 24a enter successive tang-receiving pockets 36 in the sprocket to drive the chain around bar 12. As the chain cuts wood, it picks up chips and other foreign matter, some of which are carried by the drive tangs into the pockets. Bores 40 having mouth openings at the periphery of the sprocket which are of greater width than the width of the chain allows chips and debris to exit radially from the pocket past the sides of the chain. In this way, harmful buildup of foreign matter in the pockets is prevented.

FIGS. 6 and 7 illustrate a second embodiment of the invention. In FIGS. 6 and 7 a sprocket similar to that previously described is shown, but in this embodiment axially-extending ports 46 extend fully through the sprocket and intersect bores 40. This provides both radial and axial clearance of chips and foreign matter from the pockets. It should be recognized that ports 46 could, if desired, extend only through one side of the sprocket, rather than fully therethrough.

Figure 10:
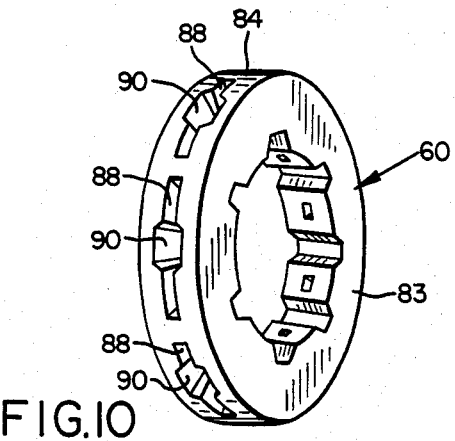
FIG. 10 is a reduced perspective view of the sprocket of FIG. 8.
Figure 9:
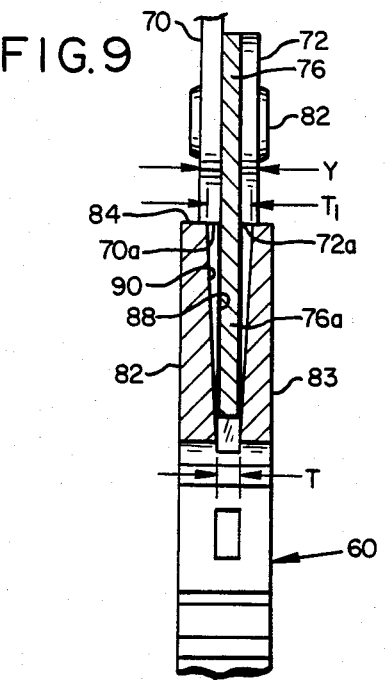
FIG. 9 is an enlarged cross sectional view taken generally along the line 9—9 in FIG. 8.

FIGS. 8, 9, and 10 illustrate an alternate embodiment 60 of the sprocket. In FIGS. 8 and 9 the sprocket is illustrated having a saw chain 64 trained thereabout. The saw chain includes a first, or leading, pair of opposed, laterally spaced side links 66, 68. Spaced rearwardly of side links 66, 68, are a second, or following, pair of opposed, laterally spaced side links, 70, 72. Each of the side links has a downwardly facing bottom surface which rests on the substantially cylindrical peripheral surface of sprocket 60, as illustrated at 66a, 70a, 72a.

A drive link 76 is interposed adjacent one of its ends between side links 66, 68 and is interposed adjacent its opposite end between side links 70, 72. The drive link bridges the space between the leading and following pairs of side links and is pivotally connected thereto. Pivotally connecting the forward end of drive link 76 to side links 66, 68 is a rivet, or pivot pin, 80. Pivotally connecting the opposite end of the drive link to side links 70, 72 is a rivet, or pivot pin, 82.

The drive link has a depending drive tang portion 76a which depends below the bottom surfaces of its adjacent side links.

As is best illustrated in FIG. 9, the outer side surfaces of the side links 66, 68 are spaced apart a distance "Y."

The sprocket 60 has side walls 82, 83 and a substantially cylindrical peripheral surface 84 in which are defined a plurality of tang-receiving pockets 88. Throughout a major portion of its length a pocket has a width measured axially of the sprocket which is just slightly greater than the thickness of drive tang 76a. This allows the bottom surfaces of the side links to rest on and be supported by the peripheral surface 84 of the sprocket.

Intermediate the ends of each pocket 88 is a radially extending clearing opening, or portion, 90 which is positioned to open radially outwardly through the periphery of the sprocket in a region between the leading and following pairs of side links. The side margins of the clearing opening diverge on progressing radially outwardly toward the periphery of the sprocket, from base dimensions of "X" by "T" to mouth dimensions of "$X_1$" by "$T_1$" as illustrated in FIGS. 8 and 9. The dimension "$T_1$" of the mouth is wider than remainder portions of the pocket 88, but its dimension "$X_1$" is only a minor portion of the length of the pocket. The clearing opening may begin to diverge at a region in the pocket at least as deep as the region into which a tang 76a extends.

In FIG. 8 imaginary lines 91, 92 have been inserted on side links 66, 70 joining the center lines of their respective front and rear rivets. Imaginary, dotted lines 94, 96 have been extended downwardly from the center pivot axes for pins 80, 82, respectively, normal to lines 91, 92. Lines 94, 96 terminate at the bottom surfaces of their associated side links at points $P_1$, $P_2$. The regions marked $C_1$, $C_2$ on the bottom surfaces of the side links progressing toward the center of the side links from points $P_1$, $P_2$ respectively, are those portions of the bottom surfaces of the side link which generally engage the periphery of the sprocket and are either formed to the contour of the periphery of the sprocket or will eventually wear to such contour.

The maximum length "$X_1$" for the mouth of the clearance opening should be less than the distance "D" between points $P_1$ and $P_2$ as the chain is trained about the sprocket. It has been found in some instances that if the mouth of clearing opening 90 extends into regions $C_1$, $C_2$ insufficient support will be provided for the bottom surfaces of the side links. This would produce a deleterious effect on the peripheral edge of the sprocket as well as on the bottom surfaces of the side links.

Although the primary purpose of the radial clearing openings is to provide clearance of debris from the tang-receiving pockets, it has been found that a reduction in noise level of the operating system also is achieved. In one series of tests a 10-12% reduction in noise level of the operating system was realized. Since noise is a problem with such apparatus, this reduction is very beneficial.

While preferred embodiments of the invention have been described herein, it should be apparent to those skilled in the art that variations and modifications are possible without departing from the spirit of the invention.

I claim:

1. A combination chain and drive sprocket wherein said chain comprises an elongate endless saw chain including a first pair of opposed laterally spaced side links, a second pair of opposed laterally spaced side links spaced longitudinally of the chain from said first pair, said side links having bottom support surfaces and outer side surfaces facing outwardly and away from the other side link in its associated pair with said outer side surfaces being spaced apart a preselected first distance, an elongate drive link interposed adjacent one of its ends between the side links of said first pair and adjacent its opposite end interposed between the side links of said second pair, and spaced first and second pivot means hingedly connecting said opposite ends of the drive link to said first and second pairs of side links, said drive link having a drive tang of preselected length and thickness which projects below the support surfaces of said side links, said sprocket comprising opposed side wall sections and a peripheral surface extending therebetween, said peripheral surface having tang-receiving pockets formed therein extending radially inwardly from the peripheral surface and bounded on opposite sides by said side wall sections, a pocket being at least the length of a drive tang and having a width greater than the thickness of said drive tang but less than said first distance, whereby said bottom support surfaces of the side links may rest on the peripheral surface adjacent the pocket, a pocket also having an enlarged clearing opening intermediate its ends, which clearing opening has a width greater than the width of remainder portions of said pocket and extends radially to open through said peripheral surface at a mouth which is wider than remainder portions of said pocket as measured axially of the sprocket and shorter than said drive tang as measured peripherally of said sprocket, said clearing opening being positioned to open into a space between said first and second pairs of side links when such chain is trained on said sprocket.

2. The combination of claim 1, wherein side margins of said clearing opening diverge on progressing radially outwardly with their greatest width being at the periphery of the sprocket.

3. The combination of claim 2, wherein said clearing opening side margins begin to diverge at a region which is at least as deep in said pocket as the drive tang will extend.

4. The combination of claim 1, wherein said clearing opening is positioned substantially centrally of the length of said pocket.

5. The combination of claim 1, wherein the length of said clearing opening as measured peripherally of said sprocket is less than the center-to-center distance between said first and second pivot means.

6. A combination drive sprocket and elongate saw chain wherein said chain comprises multiple pairs of opposed side links which have downwardly facing bottom support surfaces and are spaced apart longitudinally of said chain, with a drive link interposed between side links in a pair and bridging the space between a leading pair of side links and the pair of side links following, said drive link being pivotally connected adjacent its opposite ends to said leading and following pairs of side links and having a drive tang depending below the support surfaces of the side links, said sprocket comprising a substantially cylindrical member having a plurality of elongate pockets spaced circumferentially thereabout, bounded on opposite sides by side sections of said member, and extending radially inwardly from the periphery thereof to receive drive tangs of the chain with support surfaces of the side links resting on the periphery of said member adjacent said pockets, the majority of the length of a pocket as measured circumferentially of the member having a first width as measured axially of said member which is less than the distance between outwardly facing surfaces of the side links of such chain, and a clearing opening which is a minor portion of the length of a pocket having an opening width at the periphery of said member which is greater than said first width, said clearing opening being positioned to open outwardly into the space between the leading and following pair of side links of the chain trained on said sprocket to allow debris collected in a pocket to exit radially therefrom.

7. The combination of claim 6, wherein side margins of said clearing opening diverge on progressing radially outwardly with their greatest width being at the periphery of the sprocket.

8. The combination of claim 7, wherein said clearing opening side margins begin to diverge at a region which is at least as deep in said pocket as the drive tang will extend.

9. The combination of claim 6, wherein said clearing opening is positioned substantially centrally of the length of said pocket.

10. The combination of claim 6, wherein said drive link is pivotally connected to said leading and following pairs of side links by pivot means spaced longitudinally of the chain and said clearing opening has a length at the periphery of said member as measured circumferentially of said member which is less than the center-to-center spacing of said pivot means.

11. A drive sprocket for use with an elongate endless saw chain including a pair of opposed side links having bottom support surfaces and a drive link pivotally interconnected between said side links and having a drive tang which projects below said support surfaces, said sprocket comprising opposed side wall sections and a peripheral surface extending therebetween, said peripheral surface having pockets formed therein extending radially inwardly from said peripheral surface and having a first width as measured axially of the sprocket and a first length as measured peripherally of the sprocket to receive the drive tangs with the bottom support surfaces of the side links resting on the peripheral surface adjacent the pocket, a pocket also having an enlarged radially extending clearing opening intermediate the ends of the pocket which opens through said peripheral surface at a mouth which is wider than said first width and is shorter than and substantially centrally located relative to said first length of said pocket.

12. The sprocket of claim 11, wherein the mouth of said clearing opening is less than half the length of its associated pocket.

13. The sprocket of claim 11, wherein said margins of said clearing opening diverge on progressing radially outwardly with their greatest width being at the periphery of the sprocket.

14. The sprocket of claim 11 which further comprises a second clearing opening extending through a side wall section of said sprocket and intersecting said first-mentioned clearing opening in a region spaced radially inwardly on said sprocket from said peripheral surface.

15. A drive sprocket for use with a saw chain having spaced opposed side links connected to interposed drive links having drive tangs thereon, said sprocket comprising a substantially cylindrical member having a plurality of elongate pockets spaced circumferentially thereabout and extending radially inwardly from the periphery thereof, a pocket having a first width as measured axially of the sprocket and a first length measured peripherally of the sprocket to receive the drive tang of such chain with bottom surfaces of side links resting on marginal edge portions of the periphery of said member adjacent said pocket, the majority of the length of the pocket being of said first width, and further comprising a clearing portion which is a minor portion of and is disposed substantially centrally of the length of the pocket, said clearing portion opening at a mouth at the periphery of said member which is wider than said first width to aid in the exit of debris collected in a pocket.

16. The sprocket of claim 15, wherein said clearing portion comprises a bore extending radially inwardly from the periphery of said member to a region adjacent the bottom said pocket.

17. The drive sprocket of claim 15, wherein said clearing portion is substantially centered in remainder portions of its associated pocket as measured axially of said member, whereby substantially equal parts of said clearing portion extend to opposite sides of said pocket.

18. The sprocket of claim 15 which further comprises a clearance port extending axially through a side wall of said member and intersecting said clearing portion in a region spaced radially inwardly from the periphery of said member.

* * * * *